United States Patent
Shazeer et al.

(10) Patent No.: US 11,960,848 B2
(45) Date of Patent: *Apr. 16, 2024

(54) MACHINE-LEARNED LANGUAGE MODELS WHICH GENERATE INTERMEDIATE TEXTUAL ANALYSIS IN SERVICE OF CONTEXTUAL TEXT GENERATION

(71) Applicant: Google LLC, Mountain View, CA (US)

(72) Inventors: Noam Shazeer, Palo Alto, CA (US); Daniel De Freitas Adiwardana, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,216

(22) Filed: Feb. 3, 2023

(65) Prior Publication Data

US 2023/0177276 A1 Jun. 8, 2023

Related U.S. Application Data

(63) Continuation of application No. 17/749,844, filed on May 20, 2022, now Pat. No. 11,574,131.

(Continued)

(51) Int. Cl.
*G06F 40/35* (2020.01)
*G06F 40/20* (2020.01)
(Continued)

(52) U.S. Cl.
CPC ............ *G06F 40/35* (2020.01); *G06F 40/20* (2020.01); *G06F 40/284* (2020.01); *G10L 13/02* (2013.01)

(58) Field of Classification Search
CPC ........ G06F 40/35; G06F 40/20; G06F 40/284; G10L 13/02
(Continued)

(56) References Cited

U.S. PATENT DOCUMENTS 10,769,295 B2 * 9/2020 Loza .................... G06F 21/602
10,877,735 B1 * 12/2020 Buck ........................ G06F 8/35
(Continued)

OTHER PUBLICATIONS

International Search Report and Written Opinion for Application No. PCT/US2022/030249, mailed Sep. 8, 2022, 10 pages.
(Continued)

*Primary Examiner* — Edwin S Leland, III
(74) *Attorney, Agent, or Firm* — DORITY & MANNING P.A.

(57) ABSTRACT

The present disclosure is directed to systems and methods that include and/or leverage one or more machine-learned language models that generate intermediate textual analysis (e.g., including usage of structural tools such as APIs) in service of contextual text generation. For example, a computing system can obtain a contextual text string that includes one or more contextual text tokens. The computing system can process the contextual text string with the machine-learned language model to generate one or more intermediate text strings that include one or more intermediate text tokens. The computing system can process the one or more intermediate text strings with the machine-learned language model to generate an output text string comprising one or more output text tokens. The one or more intermediate text strings can include textual analysis of the contextual text string that supports the output text string.

20 Claims, 7 Drawing Sheets

Related U.S. Application Data

(60) Provisional application No. 63/191,563, filed on May 21, 2021.

(51) Int. Cl.
  *G06F 40/284* (2020.01)
  *G10L 13/02* (2013.01)

(58) Field of Classification Search
  USPC .............................................................. 704/9
  See application file for complete search history.

(56) References Cited

U.S. PATENT DOCUMENTS

| | | | | |
|---|---|---|---|---|
| 10,977,711 | B1* | 4/2021 | Verma | G06F 18/231 |
| 11,194,815 | B1* | 12/2021 | Kumar | G06F 16/24532 |
| 11,367,074 | B2* | 6/2022 | Zoldi | G06Q 10/0635 |
| 11,386,259 | B2* | 7/2022 | Heckel | G06N 3/045 |
| 11,574,131 | B2* | 2/2023 | Shazeer | G10L 13/02 |
| 2004/0243554 | A1* | 12/2004 | Broder | G06F 16/38 |
| 2004/0243556 | A1* | 12/2004 | Ferrucci | G06F 16/319 |
| 2004/0243557 | A1* | 12/2004 | Broder | G06F 40/30 |
| 2004/0243645 | A1* | 12/2004 | Broder | G06F 16/3344 |
| | | | | 707/E17.084 |
| 2011/0196864 | A1* | 8/2011 | Mason | G06F 16/48 |
| | | | | 707/E17.014 |
| 2014/0129227 | A1* | 5/2014 | Hagg | G10L 15/183 |
| | | | | 704/254 |
| 2017/0075877 | A1* | 3/2017 | Lepeltier | G06F 40/117 |
| 2018/0285386 | A1* | 10/2018 | Liu | G06V 30/413 |
| 2019/0138576 | A1* | 5/2019 | Bolle | G06F 40/151 |
| 2019/0197109 | A1* | 6/2019 | Peters | G06F 40/30 |
| 2019/0220619 | A1* | 7/2019 | Loza | H04L 9/14 |
| 2019/0228336 | A1* | 7/2019 | Kanagawa | G06N 5/02 |
| 2020/0110803 | A1* | 4/2020 | Djalali | G06F 3/0481 |
| 2020/0143247 | A1* | 5/2020 | Jonnalagadda | G06N 3/044 |
| 2020/0320411 | A1* | 10/2020 | Hebenthal | G06F 18/2321 |
| 2020/0394260 | A1* | 12/2020 | Wu | G06F 16/953 |
| 2021/0073465 | A1* | 3/2021 | Duong | G06F 40/30 |
| 2021/0158789 | A1* | 5/2021 | Wu | G06N 3/08 |
| 2021/0279235 | A1* | 9/2021 | He | G06F 16/243 |
| 2021/0319338 | A1* | 10/2021 | Lui | G06F 11/3672 |
| 2022/0051654 | A1* | 2/2022 | Finkelstein | G06N 3/045 |
| 2022/0067281 | A1* | 3/2022 | Hu | G06F 40/284 |
| 2022/0139384 | A1* | 5/2022 | Wu | G06F 40/30 |
| | | | | 704/257 |
| 2022/0206785 | A1* | 6/2022 | Singh | G06F 8/51 |
| 2022/0207308 | A1* | 6/2022 | Parikh | G06V 10/82 |
| 2022/0223037 | A1* | 7/2022 | Xu | G06V 10/454 |
| 2022/0374608 | A1* | 11/2022 | Shazeer | G06F 40/20 |
| 2023/0029590 | A1* | 2/2023 | De Freitas Adiwardana | |
| | | | | G06N 3/08 |
| 2023/0074406 | A1* | 3/2023 | Baeuml | G10L 15/183 |
| 2023/0177276 | A1* | 6/2023 | Shazeer | G10L 13/02 |
| | | | | 704/9 |

OTHER PUBLICATIONS

International Preliminary Report on Patentability for Application No. PCT/US2022/030249, mailed Nov. 30, 2023, 6 pages.

\* cited by examiner

MACHINE-LEARNED LANGUAGE MODELS WHICH GENERATE INTERMEDIATE TEXTUAL ANALYSIS IN SERVICE OF CONTEXTUAL TEXT GENERATION

PRIORITY CLAIM

The present application is a continuation of U.S. application Ser. No. 17/749,844 having a filing date of May 20, 2022, which claims priority to and the benefit of U.S. Provisional Patent Application No. 63/191,563, filed May 21, 2021. Each of U.S. application Ser. No. 17/749,844 and U.S. Provisional Patent Application No. 63/191,563 is hereby incorporated by reference in its entirety.

FIELD

The present disclosure relates generally to the use of machine learning for language modeling. More particularly, the present disclosure relates to machine-learned language models that generate intermediate textual analysis (e.g., including usage of structural tools such as APIs) in service of contextual text generation.

BACKGROUND

Natural language processing (NLP) has seen rapid advances in recent years and such advances are primarily attributable to improvements in learning based algorithms and other aspects of machine or "neural" learning. One particular task within the field of NLP is contextual text generation. In the contextual text generation task, an agent (e.g., a machine learning model) is tasked with generating output text from a given context. For example, the given context may include one or more contextual text strings. As such, in some example approaches to the contextual text generation task, a text-to-text model reads the input contextual text and then directly produces the output text.

One example of a contextual text generation task is a question answering task. In the question answering task, the question is the input context and the desired output is the answer to the question. Another example of a contextual text generation task is dialog generation. In dialog generation, the input context is the conversation history and the desired output is the next utterance, where the next utterance is responsive to or is otherwise sensical within the context of the conversation history.

Current state-of-the-art models for contextual text generation tend to be Transformer-based neural models, either left-to-right language models like GPT3 (Brown et al. Language Models are Few-Shot Learners, arXiv:2005.14165) where "<input> <output>" is viewed as one sequence, or sequence-to-sequence models, like the original Transformer (Vaswani et al., Attention is All You Need, arXiv: 1706.03762).

However, neural language models such as GPT3 and Transformer suffer from a number of drawbacks. Specifically, while neural language models display significant intelligence, their knowledge is constrained to the information contained in (and learned from) their training datasets and/or information introduced within the contextual text input. Thus, their knowledge of factual information is severely limited and generally frozen in time. As such, when requested to produce an output that contains factual information, the models typically either hallucinate incorrect facts or supply outdated information. Reliance upon incorrect factual information can result in inefficiencies in which incorrect actions (e.g., computerized actions) are taken and need to be corrected or otherwise remediated, resulting in redundant and unnecessary use of resources (e.g., computing resources).

As another example drawback of neural language models, their output is difficult to interpret or understand. Specifically, as such models often directly generate an output from the input, it is difficult to understand exactly why such models generated the output or which aspects of the input led to the output. A lack of interpretability in language model outputs can result in a lack of confidence or reliance on the model outputs, which can result in unnecessary overhead or other effort (e.g., computerized operations) which attempt to "double-check" the veracity or utility of the model's output.

SUMMARY

Aspects and advantages of embodiments of the present disclosure will be set forth in part in the following description, or can be learned from the description, or can be learned through practice of the embodiments.

One example aspect of the present disclosure is directed to a computing system for contextual text generation with improved interpretability. The computing system includes one or more processors and one or more non-transitory computer-readable media that collectively store: a machine-learned language model that performs textual analysis in service of contextual text generation; and instructions that, when executed by the one or more processors, cause the computing system to perform operations. The operations include obtaining a contextual text string comprising one or more contextual text tokens. The operations include processing the contextual text string with the machine-learned language model to generate one or more intermediate text strings comprising one or more intermediate text tokens. The operations include processing the one or more intermediate text strings with the machine-learned language model to generate an output text string comprising one or more output text tokens. The one or more intermediate text strings comprise textual analysis of the contextual text string that supports the output text string.

Another example aspect of the present disclosure is directed to a computer-implemented method for improved contextual text generation. The method includes obtaining a plurality of training tuples, each training tuple comprising an example contextual text string comprising one or more contextual text tokens, one or more example intermediate text strings comprising one or more intermediate text tokens, and an example output text string comprising one or more output text tokens. The method includes, for each training tuple: inputting at least a portion of the training tuple to a language model; receiving a predicted next token as an output of the language model, the predicted next token generated by the language model by processing the portion of the training tuple; evaluating a loss function that compares the predicted next token generated by the language model with an actual next token included in the training tuple; and modifying one or more values of one or more parameters of the language model based on the evaluation of the loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
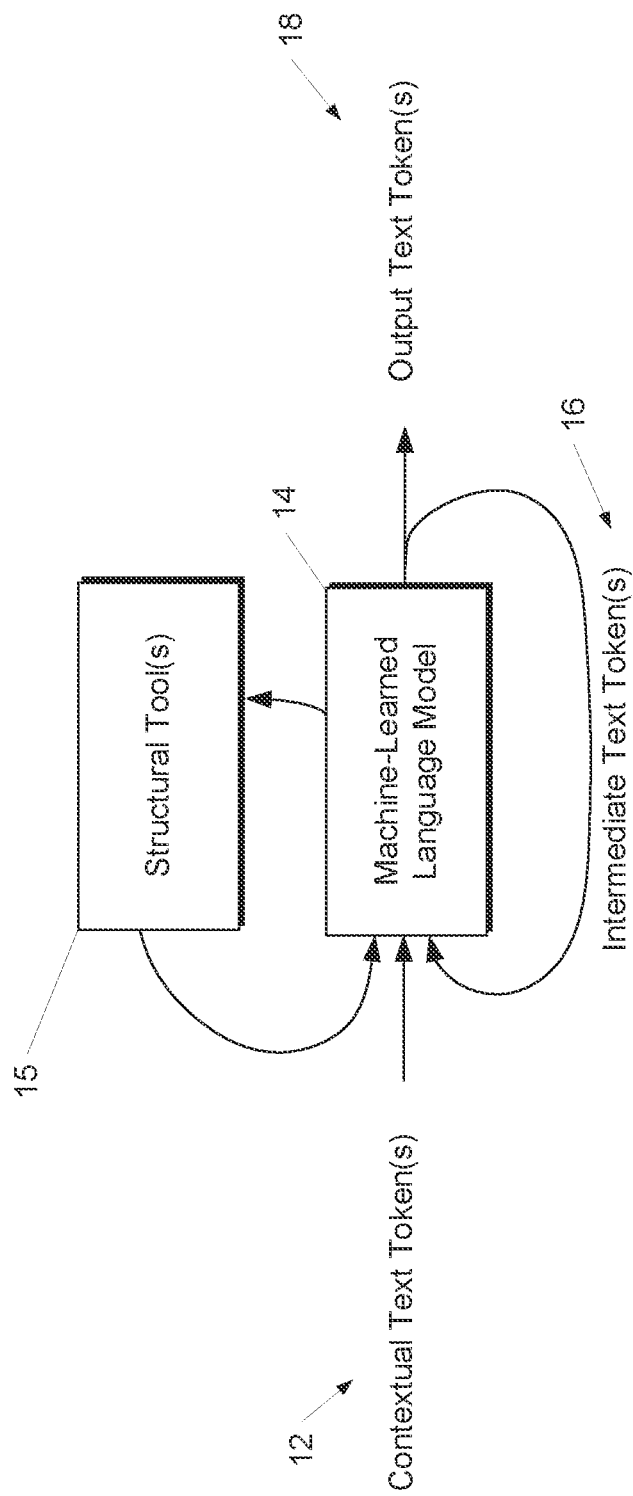
FIG. 1 depicts a block diagram of an example machine-learned language model that generates textual analysis in service of contextual text generation according to example embodiments of the present disclosure.

Reference numerals that are repeated across plural figures are intended to identify the same features in various implementations.

DETAILED DESCRIPTION

Overview

Generally, the present disclosure is directed to systems and methods that include and/or leverage one or more machine-learned language models that generate intermediate textual analysis (e.g., including usage of structural tools such as APIs) in service of contextual text generation. For example, a computing system can obtain a contextual text string that includes one or more contextual text tokens. The computing system can process the contextual text string with the machine-learned language model to generate one or more intermediate text strings that include one or more intermediate text tokens. The computing system can process the one or more intermediate text strings with the machine-learned language model to generate an output text string comprising one or more output text tokens. The one or more intermediate text strings can include textual analysis of the contextual text string that supports the output text string.

Thus, aspects of the present disclosure improve the knowledge, grounding, and interpretability of a machine-learned language model by teaching the model to generate textual analysis before (e.g., in service of) generating output text responsive to a contextual text input (e.g., generating a response to a question or prior dialog). The generation of such intermediate textual analysis can improve the interpretability of the model output. In particular, the intermediate textual analysis can be reviewed or inspected to interpret or understand how the model generated the output in response to the contextual input. This may also facilitate assessment of the reliability and/or suitability of the output in serving a particular task.

According to another aspect of the present disclosure, in some implementations, the textual analysis can include and/or leverage the use of structural tools which provide access to additional information. For example, the one or more intermediate text tokens included in the intermediate textual analysis can include at least one tool token that invokes the use of a structural tool to access additional information not included in the contextual text string and/or not included within the training data upon which the model was trained. Thus, the language model can call and use such structural tools to have access to additional information which may be up-to-date, factual, domain-specific, client- or user-specific, etc. This improves the knowledge available to the language model when formulating the textual output and further improves the flexibility of the system by enabling the introduction of various information sources for various use cases. Approaches of the disclosure may achieve improved or optimized integration with external tools since a machine-learning process may be applied to minimize computational overhead in calling such services; for example, tool tokens and the order in which they are generated may be adapted to minimize computational overheads such as latency and/or network usage.

As examples, structural tools that the machine-learned language model may have access to include: a database lookup to access additional information from a database; an application programming interface (API) call to request and receive additional information via the API; a programming language interpreter that performs a sequence of one or more operations on input text tokens; a query service that queries results from a search engine, knowledge graph, or digital assistant; a communications client that creates and transmits a communication (e.g., electronic mail, Short Message Service message, Multimedia Messaging Service message, application-based chat message, etc.) to another device or user; and/or various other forms of structural tools which generate or otherwise provide access to additional information. Thus, the structural tools are not limited to looking up information, but can also have side-effects or cause actions (e.g., booking a meeting, purchasing something, filing a ticket to humans, etc.).

The machine-learned language models described herein can be trained in a number of different approaches. In one example, human volunteers or crowd-workers can generate example intermediate analysis text for a number (e.g., thousands) of examples. For example, a human worker may be given a pair of contextual input text and output text and the human worker can generate intermediate analysis text that demonstrates an analysis of the contextual input text which leads to or otherwise supports the output text. The human worker may be given access to the structural tools and their use of such tools and the corresponding information obtained can be included in the example intermediate analysis text.

The intermediate analysis (either in training examples or as generated by the model) can in some instances contain step-by-step logic in human-readable form, such as a multi-step solution to an algebra problem. It can also contain the use of external text-to-text tools such as a database, a python interpreter, a search engine, etc., as described elsewhere herein. In some implementations, tool use in the intermediate analysis section can be marked and/or triggered by special tags which specify which tool is used and delineate the input and output of the tool. The intermediate text can contain multiple instances of tool use, as well as any amount of free-form text.

Thus, the intermediate analysis can include the use of tools (e.g., APIs) which take a structured list of input parameters and return a structured output (e.g., do_thing(a: int, b: List[str])→response_object). However, any structured input/output can also be serialized/parsed to/from free-text using some serialization method such as text serialization of Google Protos or JSON. From that point of view, text-to-text interfaces can be a superset of structured interfaces.

To generate an example training dataset, the example intermediate analysis text generated by the human annotator can be combined with the pair of contextual input text and output text to form a training tuple that includes: an example contextual text string that includes one or more contextual text tokens, one or more example intermediate text strings that include one or more intermediate text tokens, and an example output text string that includes one or more output text tokens. Thus, in some implementations, the human annotator can be given the example contextual text string and the example output text string and the human annotator can generate the example intermediate text strings. In other implementations, the human annotator can be given only the example contextual text string and the human annotator can generate both the example intermediate text strings and the example output text string.

A training dataset such as described above can be used to train a language model. For example, the training dataset can be used to fine-tune a model that has been pre-trained on tera-scale unsupervised data. As one example, the model can be trained by using the model to predict a next token contained in a training tuple (e.g., a next intermediate text token or a next output text token). A loss function can be used to evaluate the model's ability to predict the next token. The parameters of the model can be updated based on the loss function (e.g., via backpropagation-based techniques). In some implementations, training the model on each training tuple can include iteratively training on a token-by-token basis on each token contained in the intermediate text strings followed by each token contained in the output text string.

In another example, a language model can be trained to generate intermediate text in service of contextual language generation using a reinforcement learning approach. For example, aspects of the intermediate text and/or the output text generated by the model can be evaluated by an objective function to determine a reward, which can then be used to update the model parameters.

Then, at inference time, the language model can be used to generate intermediate analysis given the inputs. In some implementations, the intermediate analysis can be generated one token at a time. In some implementations, whenever the model finishes generating the input to an external tool, the tool itself is called with this input to generate the tool output, which is appended to the intermediate text, and the model continues generating from there.

Thus, aspects of the present disclosure propose extending the (input, output) training examples and language generation paradigm to have an intermediate analysis part, which is also text. As such, instead of simply generating the output given the input, the language model can learn to generate the intermediate analysis given the input and then generate the output given the input and the intermediate analysis.

Thus, whereas a dialog agent (or any other contextual text generation model) is typically trained on (context, response) pairs, in order that it can directly generate responses for a given context, in example implementations of the present disclosure a language model can instead train on (context, intermediate analysis, response) triples, and the model learns to generate (intermediate analysis|context) and (response|context, intermediate analysis).

In some implementations, the output text generated as described herein can be further processed using a text to speech system to generate an audio output. As another example, the input text can be generated from an audio input using a speech to text system. For example, a virtual assistant can interact with a user via audio inputs and outputs and audio/speech to text conversion can be used to enable the processing by the virtual assistant to occur in the textual domain as described herein.

The systems and methods of the present disclosure provide a number of technical effects and benefits. As one example, the proposed models demonstrate improved interpretability. For example, intermediate textual analysis generated by the model can be reviewed or inspected to interpret or understand how the model generated the output in response to the contextual input. Improved interpretability can lead to more efficient use of computational resources such as processor usage, memory usage, etc. For example, a lack of interpretability in language model outputs can result in a lack of confidence or reliance on the model outputs, which can result in unnecessary overhead or other effort (e.g., computerized operations) which attempt to "double-check" the veracity or utility of the model's output. By improving interpretability, confidence in computerized systems can be improved. In particular, reliability of the model outputs may be verified and/or assessed to establish usability of the system for particular tasks.

As another example technical effect and benefit, the proposed approach enables the language model to leverage structural tools to access additional information such as additional factual information. Thus, the language model can call and use such structural tools to have access to additional information which may be up-to-date, factual, domain-specific, client- or user-specific, etc. This improves the knowledge available to the language model when formulating the textual output and further improves the flexibility of the system by enabling the introduction of various information sources for various use cases.

In addition to improving the quality of the model's outputs, the proposed use of structural tools also leads to conservation of computational resources such as processor usage, memory usage, network bandwidth etc. Specifically, the knowledge available to previous language models was constrained to the information contained in (and learned from) their training datasets and/or information introduced within the contextual text input. Thus, their knowledge of factual information is severely limited and generally frozen in time. As such, when requested to produce an output that contains factual information, the models typically either hallucinate incorrect facts or supply outdated information. Therefore, an entire language model would need to be re-trained in order to keep language models up-to-date on changing real-world facts, to port the language model into a new domain or set of user information, or otherwise deploy a model in a new situation in which new information was at issue. Re-training of a language model requires the use of computational resources such as processor usage, memory usage, network bandwidth, etc.

However, the use of structural tools proposed by the present disclosure obviates the need to re-train the model in order to keep language models up-to-date on changing real-world facts, to port the language model into a new domain or set of user information, or otherwise deploy a model in a new situation in which new information was at issue. Instead, the model can simply be given access (e.g., via structural tools) to additional information which may be up-to-date, factual, domain-specific, client- or user-specific, etc. Thus, the model can easily be ported to different domains, uses, users, etc. and/or can provide responses which leverage up-to-date factual information without the need to re-train the model, thereby significantly conserving computational resources. By encoding the context in the form of intermediate analysis which may interface with (potentially external) information sources, the process may contribute to the resolution of technical constraints in the provision of information and/or functionality.

Similarly, another example technical effect is derived from the model's ability to leverage external sources to obtain information, rather than needing to store (e.g., in the form of learned relationships) all of the information needed to respond to various inputs. In particular, past approaches required storage and use (e.g., on a user device with constrained memory and/or battery availability) of a large model which had sufficient size (e.g., number of parameters) to learn and store relationships among various inputs and outputs. In contrast, some example implementations of the present disclosure can enable a "thin" (smaller) model to live on a user device or other mobile client or browser. The thin model can leverage various structural tools (e.g., cloud services) to save battery, compute, storage, updating, etc. Thus, smaller models with access to structural tools can achieve similar or superior performance to large self-contained models, thereby saving computing resources such as memory usage, network bandwidth, energy consumption, etc.

With reference now to the Figures, example embodiments of the present disclosure will be discussed in further detail.

Example Language Models that Generate Intermediate Textual Analysis

FIG. 1 depicts a block diagram of an example machine-learned language model 14 that generates textual analysis in service of contextual text generation according to example embodiments of the present disclosure. Specifically, the language model 14 can receive a contextual text string 12 that includes one or more contextual text tokens. The language model 14 can process the contextual text string 12 to generate one or more intermediate text strings 16 that include one or more intermediate text tokens. The language model 14 can process the one or more intermediate text strings 16 to generate an output text string that includes one or more output text tokens 18. The one or more intermediate text strings 16 can include textual analysis of the contextual text string 12 that supports, leads to, evidences, or otherwise demonstrates logical analysis of the contextual text string 12 to generate the output text string 18.

According to an aspect of the present disclosure, in some implementations, the one or more intermediate text tokens 16 can include at least one tool token that invokes use of a structural tool 15 to access additional information not included in the contextual text string 12. In some implementations, the structural tool 15 can include a database lookup to access additional information from a database. In some implementations, the structural tool 15 can include an application programming interface (API) call to request and receive additional information via the API. In some implementations, the structural tool 15 can include a programming language interpreter that performs a sequence of one or more operations on input text tokens. In some implementations, the structural tool 15 can include a query service that queries results from a search engine, knowledge graph, or digital assistant. In addition to the tool token, the one or more intermediate text tokens 16 can further include at least one natural language text token.

In some implementations, when the machine-learned language model 14 generates the tool token, a computing system can: pause the machine-learned language model; execute the structural tool 15 to access the additional information; append the additional information to a current version of the one or more intermediate text strings 16; and resume text generation with the machine-learned language model 14 based on the current version of the one or more intermediate text strings 16 and the appended additional information.

In some implementations, the machine-learned language model 14 operates on a token-by-token basis. In some of such implementations, when generating the one or more intermediate text strings 16, the language model 16 receives each generated intermediate text token 16 as input in a recursive fashion.

Thus, in some implementations, processing the contextual text string 12 with the machine-learned language model 14 to generate the one or more intermediate text strings 16 that include the one or more intermediate text tokens can be performed over a number of iterations. At a first iteration, a computing system can process the contextual text string 12 with the machine-learned language model 14 to generate a first intermediate text string 16 comprising one or more intermediate text tokens. The computing system can then append the first intermediate text string 16 to the contextual text string 12 to generate an updated contextual text string. Then, for each of one or more additional iterations and until the machine-learned language model outputs a closing token, the computing system can process the updated contextual text string with the machine-learned language model 14 to generate an additional intermediate text string 16 that include one or more intermediate text tokens. The computing system can append the additional intermediate text string to the updated contextual text string to generate the updated contextual text string for the next iteration.

The machine-learned language model 14 can be or include various types of models, including, as examples, a recurrent neural network; a multi-headed self-attention model; a sequence-to-sequence model; and/or other forms of language models. Language models can be doze models or can be left-to-right models. Language models can optionally have an encoder-decoder architecture.

In some example implementations, the machine-learned language model 14 can be a question answering model and the contextual text string 12 can be or include a question. In some example implementations, the machine-learned language model 14 can be a dialog model and the contextual text string 12 can be or include a dialog history.

In some implementations, at least a portion of the contextual text string 12 includes or corresponds to text that was input by a user. In some implementations, a computing system can provide at least the output text string 18 for display to the user.

Figure 2:
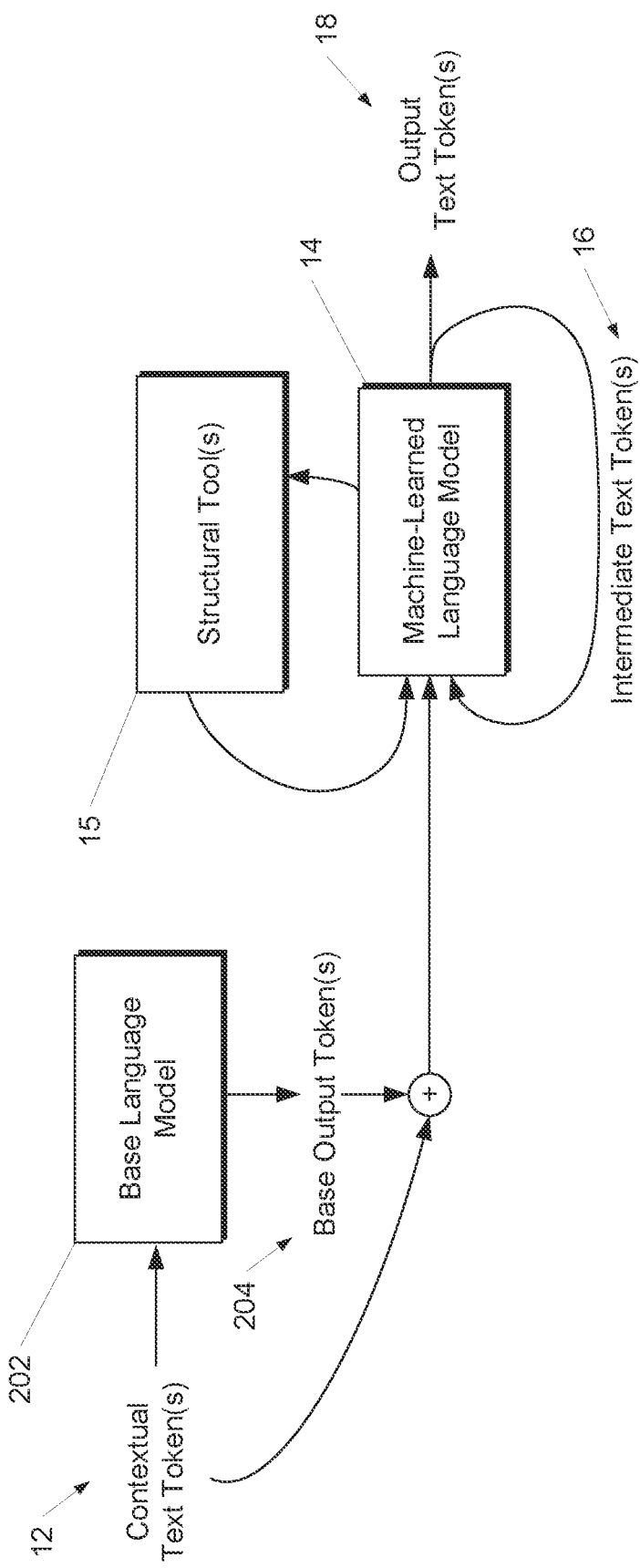
FIG. 2 depicts a block diagram of an example machine-learned language model that generates textual analysis in service of contextual text generation according to example embodiments of the present disclosure.

FIG. 2 depicts a block diagram of an example machine-learned language model 14 that generates textual analysis in service of contextual text generation according to example embodiments of the present disclosure. In particular, FIG. 2 is similar to FIG. 1 except that in FIG. 2, the contextual text string 12 is additionally input into a base language model 202. The base language model 202 can in some implementations be configured to directly generate a base output 204 from the contextual text string 12 without generating intermediate text strings. As illustrated in FIG. 2, the base output 204 is combined with (e.g., appended to or concatenated with) the contextual text string 12 and the combined string is then input into the machine-learned language model 14.

Use of a base language model 202 in this fashion can allow the role of the machine-learned language model 14 to shift to an error-correction or "fact-checking" role. In particular, in FIG. 1, the model 14 is primarily responsible for generating the output text 18. In contrast, in FIG. 2, the role of the model 14 may be to supplement or correct facts contained within the base output 204. In this fashion, an existing base language model 202 can be extended or leveraged through the addition of the model 14 with access to structural tools 15.

This may, for example, enable the application of the model 14 and tools 15 to any number of different existing based models which may already have been trained for different tasks, context, domains, users, applications, etc. Thus, any application which already has a custom language model can be combined with the additional model 14 to provide improved use of factual or up-to-date information when generating contextual language outputs.

Figure 3:
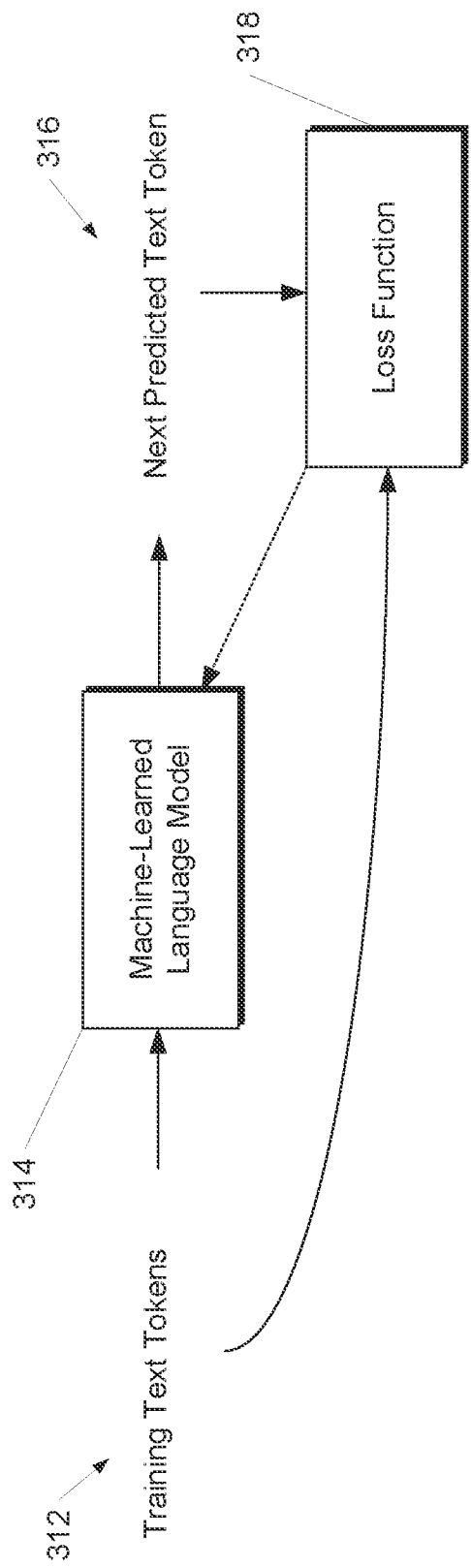
FIG. 3 depicts a block diagram of an example training process for a machine-learned language model that generates textual analysis in service of contextual text generation according to example embodiments of the present disclosure.

FIG. 3 depicts a block diagram of an example training process for a machine-learned language model that generates textual analysis in service of contextual text generation according to example embodiments of the present disclosure. Specifically, FIG. 3 shows a supervised training approach.

As shown in FIG. 3, a number of training text tokens 312 can be obtained. A portion of the training text tokens 312 can be input into the language model 314. The model 314 can predict a next predicted text token 316 for the training text tokens 312. For example, the next predicted text token can be an example intermediate text token or can be an example output token. The next predicted text token 316 can be compared with the ground truth text token contained in the training text token 312 using a loss function 318. The parameters of the model 314 can be updated based on the loss function 318 (e.g., a log loss function or similar). The process shown in FIG. 3 can be iteratively and sequentially performed for each text token contained in the training text tokens 312. For example, one way to do this is to train a left-to-right language model on the token sequence [<tokenized-context>, EOS, <tokenized-reasoning>, EOS, <tokenized-response>, EOS]. The process can be performed over a number of different training examples.

In some examples, the training data can be collected via a volunteer/crowd-worker interface. Aa one example, a human annotator can interact with a base language model. After the base language model issues a response, the human annotator may open up a feedback interface which allows the user to enter "intermediate analysis" and/or edit the output of the base language model's response. The "intermediate analysis" can begin with a call to the base language tool, the output of which can include several example responses to the current context, generated by the base language model. The human annotator may then add intermediate analysis, which may include additional tool use. To facilitate the tool use, a form can be provided which allows the human annotator to query the tools, and which has a button to append the tool input/output to the intermediate analysis. When the human annotator is finished adding intermediate analysis, the human annotator optionally modifies the base model's response, and clicks "save", which returns the human annotator to the conversational interface. The changes are reflected in the base model's response, and it is the human annotator's turn to say something. In some implementations, the base model can simply be viewed as another tool which was used.

Figure 4:
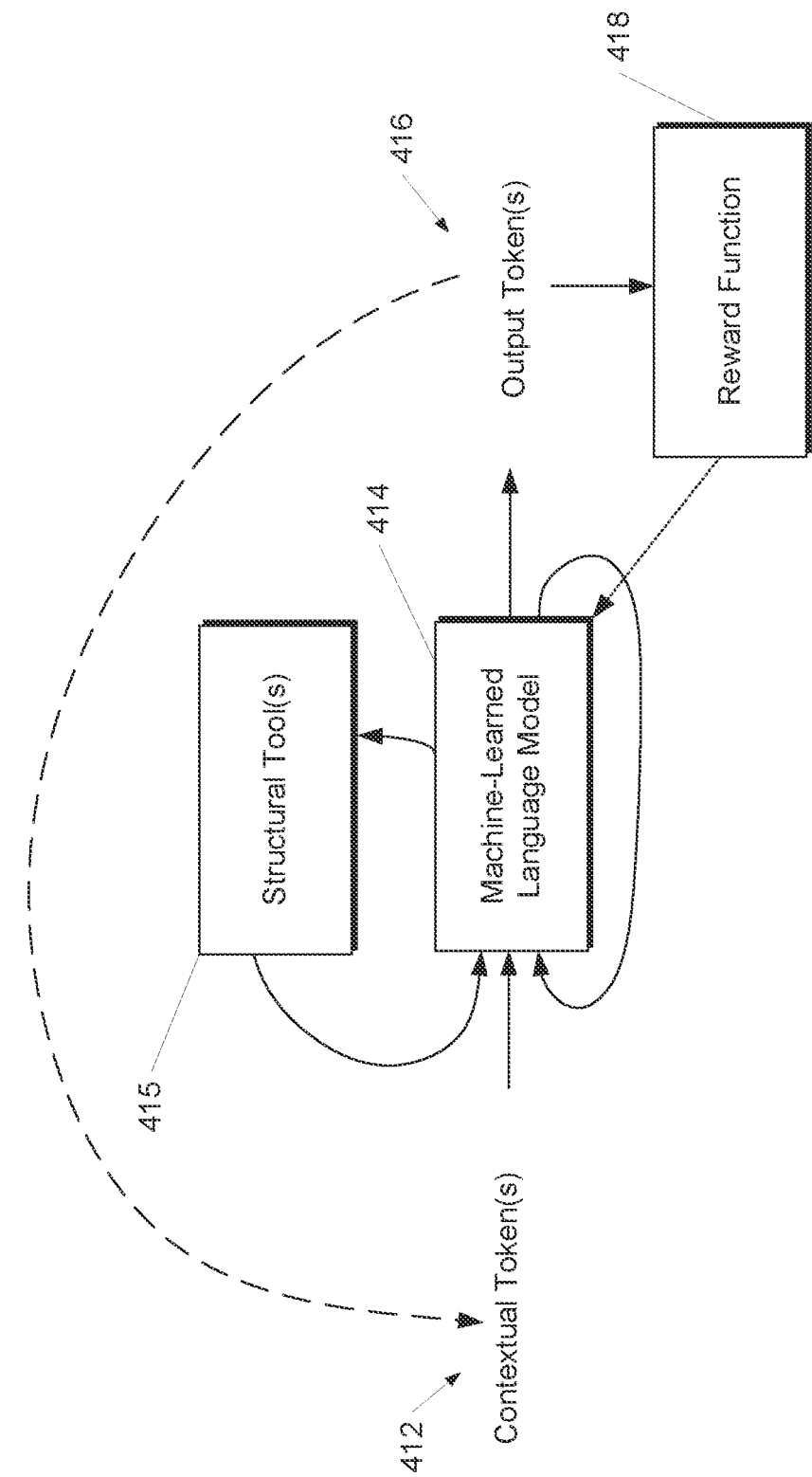
FIG. 4 depicts a block diagram of an example training process for a machine-learned language model that generates textual analysis in service of contextual text generation according to example embodiments of the present disclosure.

FIG. 4 depicts a block diagram of an example training process for a machine-learned language model that generates textual analysis in service of contextual text generation according to example embodiments of the present disclosure. Specifically, FIG. 4 shows a reinforcement training approach.

As shown in FIG. 4, one or more contextual tokens 412 can be input into a machine-learned language model 414 such as those described in FIGS. 1 and 2. The model 414 can generate intermediate text strings (e.g., which may include accessing or leveraging structural tools 415). Ultimately, the model 414 can generate one output token(s) 416. A reward function 418 can determine a reward based on the output tokens 416. The reward function 418 can determine how well the output tokens 416 satisfied or led to satisfaction of some objective (e.g., user satisfaction). Optionally, the output tokens 416 can be supplied to a user or other interactive agent to result in additional, new contextual tokens, which can restart the illustrated process.

Example Text Generation with Intermediate Analysis

This section provides some examples of intermediate textual analysis which demonstrate various example applications.

Calling a Base Agent, then Fact-Checking/Supplementing:
Context:
Agent: hi
User: hi, what can you tell me about Mexico?
Intermediate Analysis:
<tool: base-pass-context> # gets context automatically
<tool-output>
Mexico, officially the United Mexican States, is a country in the southern portion of North America.
Mexico is bordered to the north by the United States; to the south and west by the Pacific Ocean; to the southeast by Guatemala, Belize, and the Caribbean Sea; and to the east by the Gulf of Mexico.
The president of Mexico is the head of state and head of government of Mexico.
</tool>
<tool: assistant>
current president of Mexico
<tool-output>
Andrés Manuel López Obrador
</tool>
Response:
Mexico, officially the United Mexican States, is a country in the southern portion of North America. The current president of Mexico is Andres Manuel López Obrador.
End-to-End Customer Support
Context 1:
Cust: hi. i lost my password
Intermediate Analysis 1:
<tool internet provider API>
how to retrieve lost password
<tool-output>

You need to go to internetprovider.com/password
</tool>
Output 1:
Agent: Hi. I'm sorry this happened to you! You can reset your
password at internetprovider.com/password
Context 2:
Cust: ah ok . . . so i recovered it, but my internet is slow
Intermediate Analysis 2:
<tool internet provider API>
what to do when internet is slow
<tool-output>
you just need to measure the speed with the custom Internet Provider meter
</tool>
<tool meter>
customer id 777
<tool-output>
1234 Mbps
</tool>
<tool cust-acct>
customer id777
<tool-output>
John Doe
Internet Provider Ultimate Plan
expected speed: 1000 Mbps
</tool>
Output 2:
Agent: ok. I'm seeing that you have bought the 1000 Mbps package, and you're getting 1234 Mbps, so everything is working as intended. Would you like to upgrade?

Example Devices and Systems

Figure 5A:
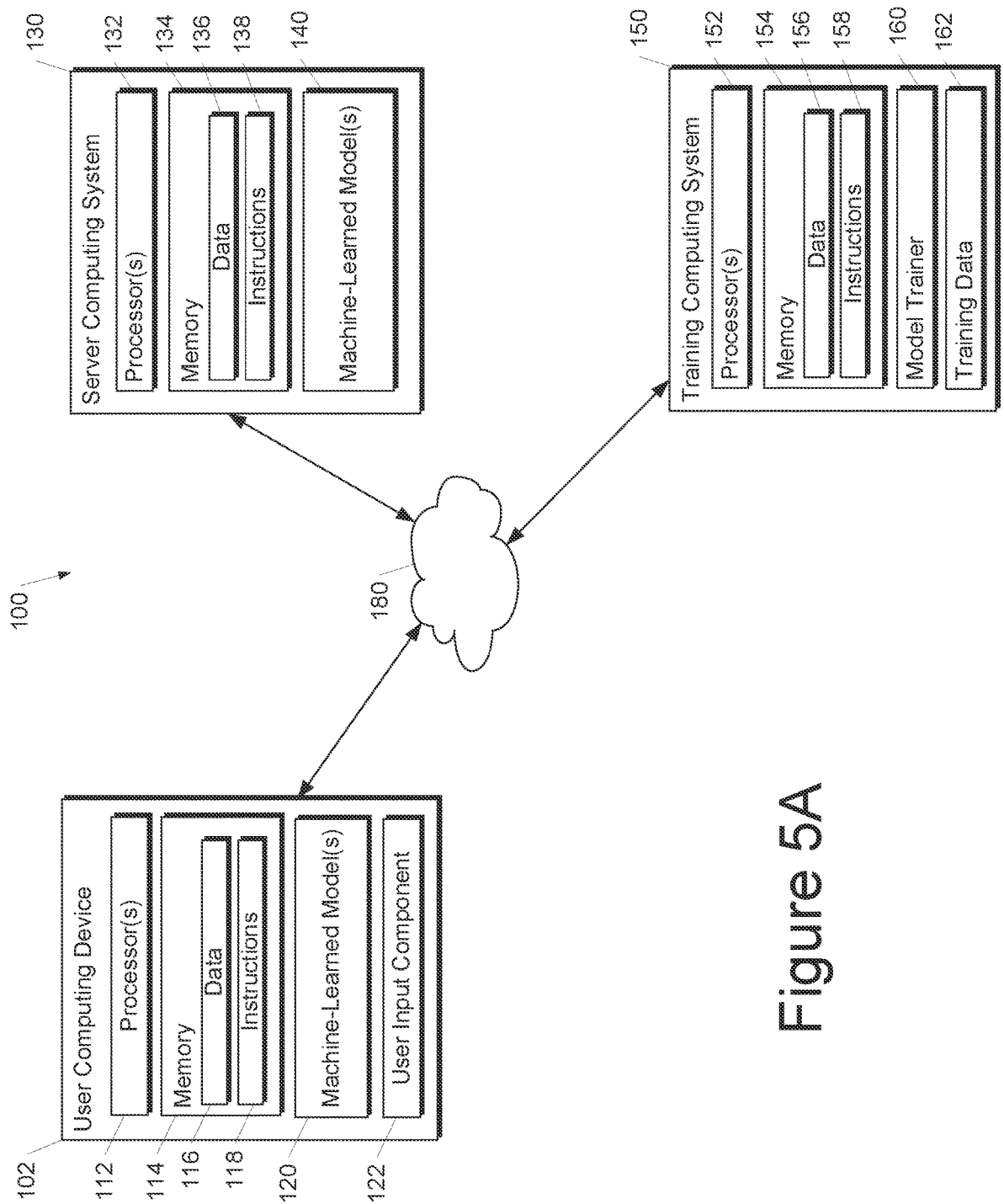
FIG. 5A depicts a block diagram of an example computing system according to example embodiments of the present disclosure.

FIG. 5A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 1-4.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel language generation across multiple instances of language generation tasks).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a language generation service such as a question answer service, a dialog service (e.g., as used by a "chatbot" or a digital assistant), etc.). Thus, one or more models 120 can be stored and implemented at the user computing device 102 and/or one or more models 140 can be stored and implemented at the server computing system 130. The models 120 and/or 140 can be used by any language generation service such as a question answer service, a dialog service (e.g., as used by a "chatbot" or a digital assistant), etc.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1-4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, a plurality of training tuples. Each training tuple can include an example contextual text string comprising one or more contextual text tokens, one or more example intermediate text strings comprising one or more intermediate text tokens, and an example output text string comprising one or more output text tokens.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 5A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 5B:
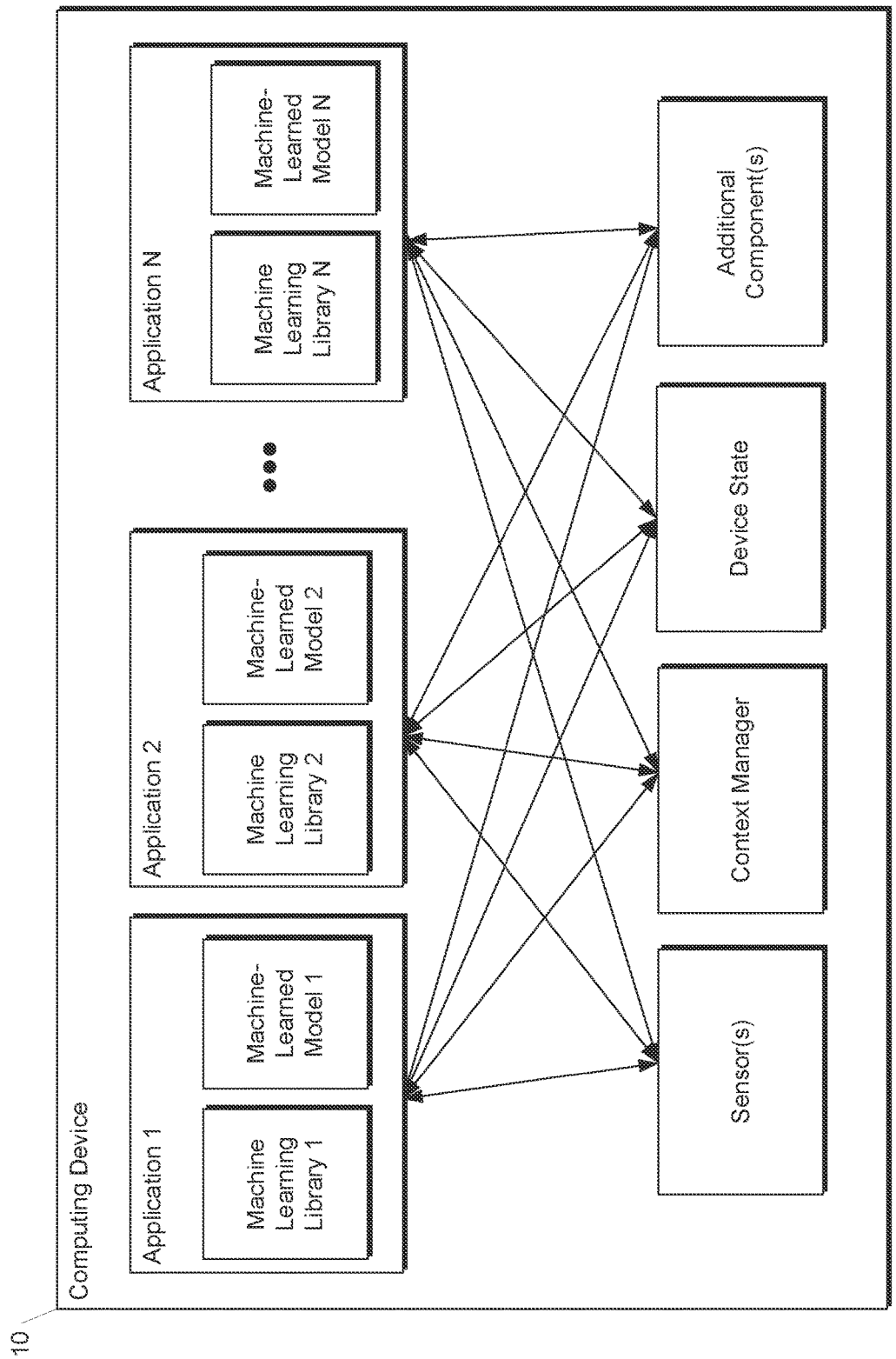
FIG. 5B depicts a block diagram of an example computing device according to example embodiments of the present disclosure.

FIG. 5B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 5C:
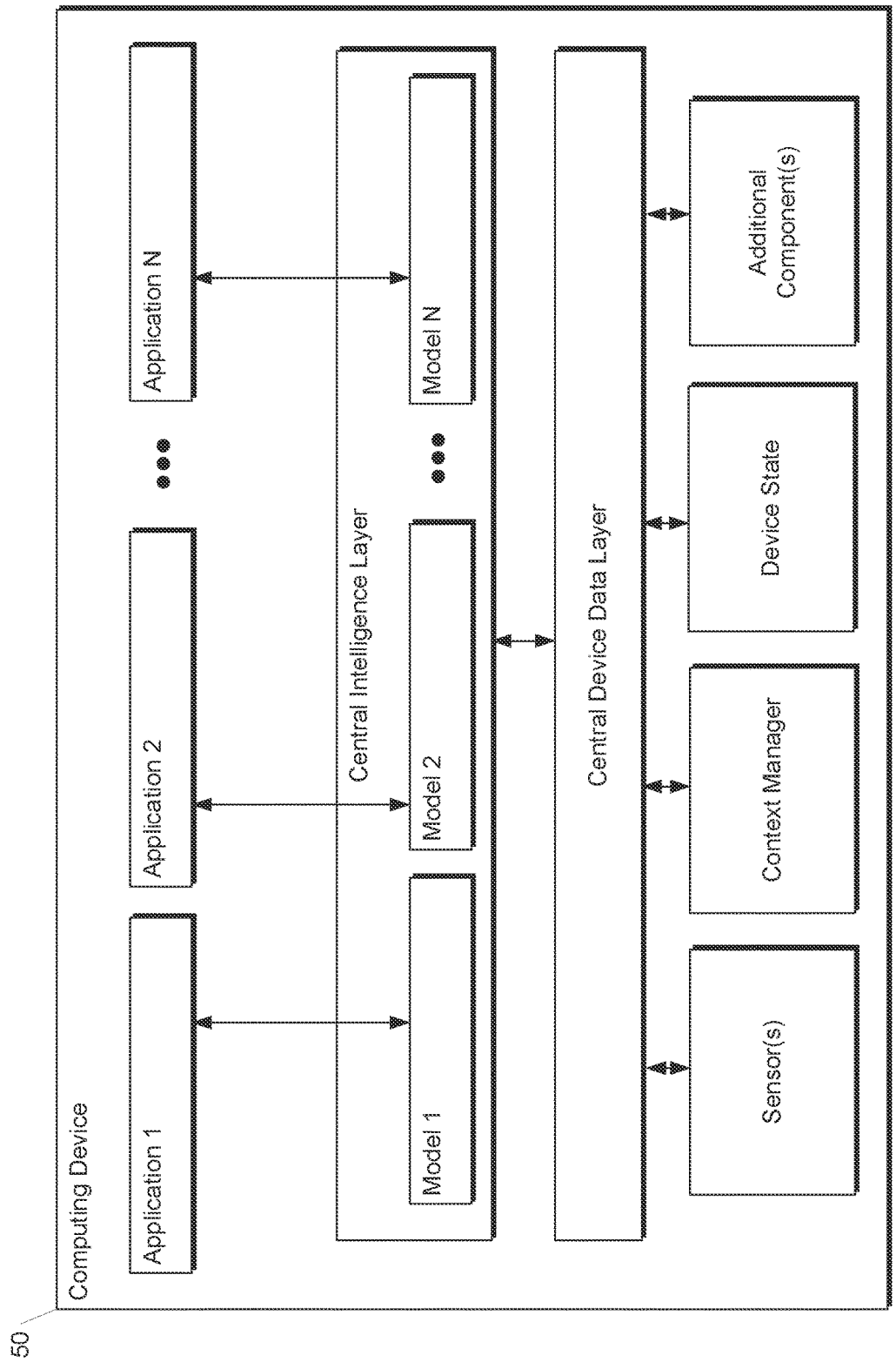
FIG. 5C depicts a block diagram of an example computing device according to example embodiments of the present disclosure.

FIG. 5C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for operating a machine-learned language model to interact with a search engine to generate output text based on input text, the computing system comprising:
one or more processors;
one or more non-transitory computer-readable media that collectively store:
a machine-learned language model; and
instructions that, when executed by the one or more processors, cause the computing system to perform operations, the operations comprising:
obtaining, by the computing system comprising one or more computing devices, the input text;
processing, by the computing system, the input text with the machine-learned language model to generate intermediate text as an intermediate output of the machine-learned language model, wherein the intermediate text invokes a query service to query results from the search engine;
obtaining, by the computing system, the results from the search engine;
processing, by the computing system, at least one of the results from the search engine with the machine-learned language model to generate the output text; and
providing, by the computing system, the output text as an output.

2. The computing system of claim 1, wherein the input text comprises a question input by a user, and wherein the output text comprises an answer to the question.

3. The computing system of claim 1, wherein:
the operations further comprise appending the at least one of the results from the search engine to the input text to generate updated text; and
processing, by the computing system, the at least one of the results from the search engine with the machine-learned language model to generate the output text comprises processing, by the computing system, the updated text with the machine-learned language model to generate the output text.

4. The computing system of claim 1, wherein at least a portion of the intermediate text is structured according to an application programming interface associated with the search engine.

5. The computing system of claim 1, wherein the machine-learned language model comprises a transformer model.

6. The computing system of claim 1, wherein the input text comprises text input by a user.

7. The computing system of claim 1, wherein the machine-learned language model has been trained using reinforcement learning.

8. A computer-implemented method for operating a machine-learned language model to interact with a search engine to generate output text based on input text, the method comprising:
obtaining, by a computing system comprising one or more computing devices, the input text;
processing, by the computing system, the input text with the machine-learned language model to generate intermediate text as an intermediate output of the machine-learned language model, wherein the intermediate text invokes a query service to query results from the search engine;
obtaining, by the computing system, the results from the search engine;
processing, by the computing system, at least one of the results from the search engine with the machine-learned language model to generate the output text; and
providing, by the computing system, the output text as an output.

9. The computer-implemented method of claim 8, wherein the input text comprises a question input by a user, and wherein the output text comprises an answer to the question.

10. The computer-implemented method of claim 8, wherein:
the method further comprises appending the at least one of the results from the search engine to the input text to generate updated text; and processing, by the computing system, the at least one of the results from the search engine with the machine-learned language model to generate the output text comprises processing, by the computing system, the updated text with the machine-learned language model to generate the output text.

11. The computer-implemented method of claim 8, wherein at least a portion of the intermediate text is structured according to an application programming interface associated with the search engine.

12. The computer-implemented method of claim 8, wherein the machine-learned language model comprises a transformer model.

13. The computer-implemented method of claim 8, wherein the input text comprises text input by a user.

14. The computer-implemented method of claim 8, wherein the machine-learned language model has been trained using reinforcement learning.

15. One or more non-transitory computer-readable media that collectively store instructions that, when executed by one or more processors of a computing system, cause the computing system to perform operations, the operations comprising:
  obtaining, by the computing system, an input text;
  processing, by the computing system, the input text with a machine-learned language model to generate intermediate text as an intermediate output of the machine-learned language model, wherein the intermediate text invokes a query service to query results from the search engine;
  obtaining, by the computing system, the results from the search engine;
  processing, by the computing system, at least one of the results from the search engine with the machine-learned language model to generate an output text; and
  providing, by the computing system, the output text as an output.

16. The one or more non-transitory computer-readable media of claim 15, wherein the input text comprises a question input by a user, and wherein the output text comprises an answer to the question.

17. The one or more non-transitory computer-readable media of claim 15, wherein:
  the operations further comprise appending the at least one of the results from the search engine to the input text to generate updated text; and
  processing, by the computing system, the at least one of the results from the search engine with the machine-learned language model to generate the output text comprises processing, by the computing system, the updated text with the machine-learned language model to generate the output text.

18. The one or more non-transitory computer-readable media of claim 15, wherein at least a portion of the intermediate text is structured according to an application programming interface associated with the search engine.

19. The one or more non-transitory computer-readable media of claim 15, wherein the input text comprises text input by a user.

20. The one or more non-transitory computer-readable media of claim 15, wherein the machine-learned language model has been trained using reinforcement learning.

* * * * *